(12) United States Patent
Barbu et al.

(10) Patent No.: US 10,110,401 B2
(45) Date of Patent: Oct. 23, 2018

(54) METHODS AND DEVICES FOR CHANNEL ESTIMATION FOR MOBILE SYSTEMS OF INSUFFICIENT CYCLIC PREFIX LENGTH

(71) Applicant: Intel IP Corporation, Santa Clara, CA (US)

(72) Inventors: Oana-Elena Barbu, Aalborg (DK); Carles Navarro Manchon, Aalborg (DK); Mihai Badiu, Aalborg (DK); Christian Rom, Norresundby (DK); Bernard Fleury, Aalborg (DK)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/565,557

(22) PCT Filed: Apr. 5, 2016

(86) PCT No.: PCT/EP2016/057395
§ 371 (c)(1),
(2) Date: Oct. 10, 2017

(87) PCT Pub. No.: WO2016/177522
PCT Pub. Date: Nov. 10, 2016

(65) Prior Publication Data
US 2018/0123837 A1 May 3, 2018

(30) Foreign Application Priority Data

May 6, 2015 (DE) .......................... 10 2015 107 080

(51) Int. Cl.
*H04L 25/02* (2006.01)
*H04L 25/03* (2006.01)

(52) U.S. Cl.
CPC ...... *H04L 25/03987* (2013.01); *H04L 25/022* (2013.01); *H04L 25/0212* (2013.01);
(Continued)

(58) Field of Classification Search
CPC ........... H04L 25/03987; H04L 25/0242; H04L 25/03821; H04L 25/0212; H04L 25/0222;
(Continued)

(56) References Cited

U.S. PATENT DOCUMENTS

| 9,042,468 B2 | 5/2015 | Barbu et al. |
| 9,948,415 B2 * | 4/2018 | Badiu .................. H04B 17/391 |

(Continued)

FOREIGN PATENT DOCUMENTS

DE 102014008347 A1 12/2015

OTHER PUBLICATIONS

International Search Report dated Sep. 9, 2016 for International Application No. PCT/EP2016/057395.
(Continued)

*Primary Examiner* — Dac Ha
(74) *Attorney, Agent, or Firm* — Eschweiler & Potashnik, LLC

(57) ABSTRACT

A method of estimating a channel for mobile systems with insufficient cyclic prefix length, wherein the channel comprises a plurality of multipath components $(\bar{\alpha},\bar{\tau})$, includes: receiving a signal $(y_n)$ comprising a plurality of contributions of a transmit signal $(x_n[k], x_{n-1}[k])$ transmitted during a plurality of transmission time intervals (n, n-1) on a plurality of sub-carriers of known pilots $(k \in P_b)$ and a plurality of sub-carriers of unknown data $(k \notin P_b)$; determining an estimate of the plurality of multipath components $(\bar{\alpha}, \bar{\tau})$ based on a probabilistic relation between the plurality of first contributions $(x_n[k], x_{n-1}[k])$ of the transmit signal, wherein the plurality of first contributions are transmitted during adjacent transmission time intervals (n, n-1), and an observation of the received signal $(y_n[k])$ at a subcarrier $(k \in P_b)$ of the known pilots, wherein the probabilistic rela- (Continued)

tion is based on statistical properties of the plurality of first contributions ($x_n[k]$, $x_{n-1}[k]$) of the transmit signal.

25 Claims, 6 Drawing Sheets

(52) U.S. Cl.
CPC ...... *H04L 25/0222* (2013.01); *H04L 25/0242* (2013.01); *H04L 25/03821* (2013.01); *H04L 25/0204* (2013.01); *H04L 25/0256* (2013.01); *H04L 2025/03414* (2013.01)

(58) Field of Classification Search
CPC ......... H04L 25/022; H04L 2025/03414; H04L 25/0256; H04L 25/0204
See application file for complete search history.

(56) References Cited

U.S. PATENT DOCUMENTS

| | | | |
|---|---|---|---|
| 2011/0096816 A1* | 4/2011 | Siti | H04L 25/0204 375/219 |
| 2012/0076214 A1* | 3/2012 | Wei | H04L 25/0204 375/259 |
| 2013/0094620 A1 | 4/2013 | Alexander et al. | |
| 2015/0043629 A1 | 2/2015 | Thompson et al. | |

OTHER PUBLICATIONS

Prasa, Ranjitha et al. "Joint Approximately Sparse Channel Estimation and Data Detection in OFDM Systems Using Sparse Bayesian Learning." IEEE Transactions on Signal Processing, vol. 62, No. 14, Jul. 15, 2014. pp. 3591-3603.

Pedersen, Niels Lovmand et al. "Application of Bayesian Hierarchical Prior Modeling to Sparse Channel Estimation." IEEE ICC 2012, Signal Processing for Communications Symposium. pp. 3487-3492.

Riegler, Erwin et al. "Merging Belief Propagation and the Mean Field Approximation: A Free Energy Approach." IEEE Transactions on Information Theory, vol. 59, No. 1, Jan. 2013. pp. 588-602.

Pedersen, Niels Lovmand et al. "A Fast Iterative Bayesian Inference Algorithm for Sparse Channel Estimation." IEEE IC 2013 Signal Processing for Communications Symposium. 6 pages.

* cited by examiner

METHODS AND DEVICES FOR CHANNEL ESTIMATION FOR MOBILE SYSTEMS OF INSUFFICIENT CYCLIC PREFIX LENGTH

This application is a National Phase entry application of International Patent Application No. PCT/EP2016/057395 filed Apr. 5, 2016, which claims priority to German Patent Application 102015107080.4 filed on May 6, 2015, entitled "METHODS AND DEVICES FOR CHANNEL ESTIMATION FOR MOBILE SYSTEMS OF INSUFFICIENT CYCLIC PREFIX LENGTH" in the name of Oana-Elena Barbu et al. and is hereby incorporated by reference in its entirety.

TECHNICAL FIELD

The present disclosure generally relates to methods and devices for channel estimation for mobile systems of insufficient cyclic prefix length. In particular, aspects of the present disclosure relate to methods and devices for estimating a channel based on a received signal comprising contributions of a transmit signal transmitted during a plurality of transmission time intervals on sub-carriers of known pilots and sub-carriers of unknown data.

BACKGROUND

In many outdoor scenarios, the wireless multipath channel exhibits multipath components whose delays are longer than the Cyclic Prefix (CP) used in multi-carrier systems such as orthogonal frequency-division multiplexing (OFDM). The aforementioned system may be referred to as "insufficient CP system". In insufficient CP systems, the multipath components with delays longer than the CP lead to two types of interference, namely Inter-Symbol Interference (ISI) and Inter-Carrier Interference (ICI). This means that the samples of the current symbol are interfered by samples of the previous symbol (ISI), but they also exhibit self-interference, i.e. each subcarrier leaks power on the adjacent subcarriers (ICI).

Classic pilot-based (PB) channel estimators ignore ISI and ICI, which—as a result—severely affects the quality of the computed estimates. This causes an overall degradation of the receiver's performance. Data-aided iterative algorithms which sequentially refine the channel and data estimates and which cancel ISI and ICI, achieve close to optimal performance. However, such schemes suffer from high computational complexity.

In LTE OFDM systems operating over channels with maximum excess delay (MED) greater than CP duration, the receiver performance is degraded by ISI and ICI. Classic PB channel estimators neglect the interference arising in such scenarios, and therefore, compute poor channel estimates. These estimates once fed to the equalizer and decoding block, impair the BER performance of the receiver. Given their low complexity and good performance in scenarios with channel MED shorter than CP duration, PB estimators are usually preferred in the design of the LTE receiver.

It may be desirable to improve channel estimation in mobile systems of insufficient CP length without significantly increasing computational complexity.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

DESCRIPTION

Figure 1:
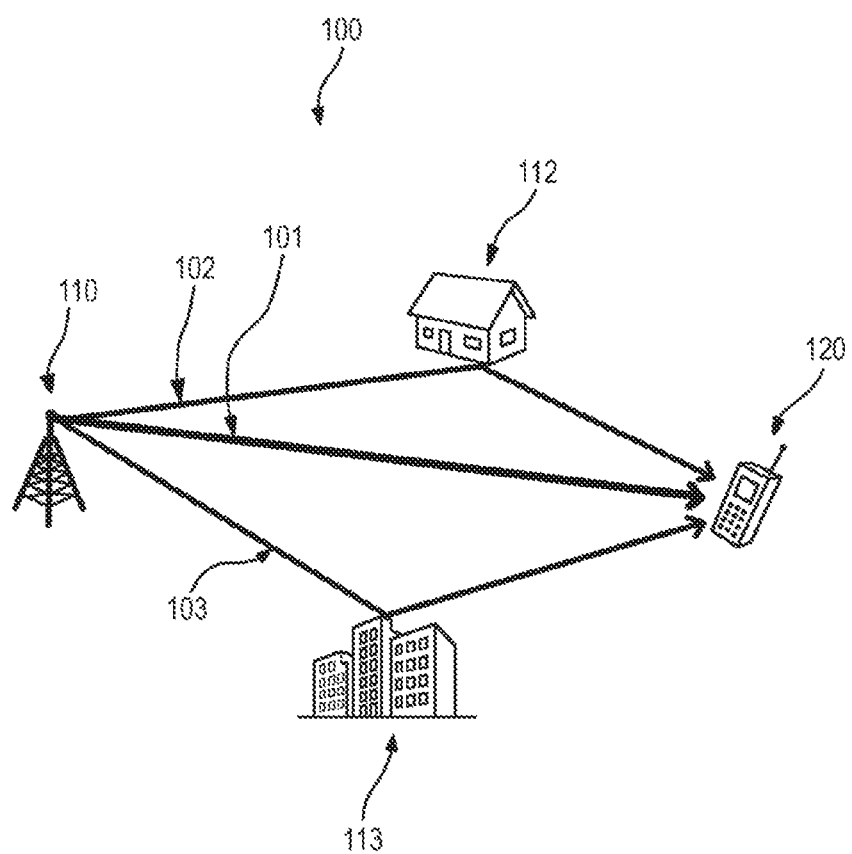
FIG. 1 is a schematic diagram illustrating a wireless system 100 including a base station 110 and a mobile station 120, the mobile station 120 applying techniques for channel estimation.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

The following terms, abbreviations and notations will be used herein:
OFDM: Orthogonal Frequency Division Multiplex,
LTE: Long Term Evolution,
CRS: Cell-specific Reference Signal,
TX: Transmit,
RX: Receive,
CP: Cyclic Prefix,
SNR: Signal to Noise Ratio,
MSE: Mean Squared Error,
MMSE: Minimum Mean Square Error,
MF: Mean Field,
MFBP: Mean Field Belief Propagation,
BER: Bit Error Rate,
CIR: Channel Impulse Response,
CFR: Channel Frequency Response,
ISI: Inter-Symbol Interference,
ICI: Inter-Carrier Interference,
AWGN: Additive White Gaussian Noise,
RF: Radio Frequency,
UE: User Equipment,
LLR: Logarithmic Likelihood Ratio,
pdf: probability density function,
MED: maximum excess delay,
PB: pilot-based.

The methods and devices described herein may be based on channel estimation, in particular channel estimation of wireless multipath channels with multipath components whose delays are longer than the Cyclic Prefix. It is understood that comments made in connection with a described method may also hold true for a corresponding device configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on 3G, 4G, 5G and CDMA standards. The methods and devices described below may further be implemented in a base station (NodeB, eNodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to about 300 GHz. The frequency range may correspond to frequencies of alternating current electrical signals used to produce and detect radio waves.

FIG. 1 depicts a wireless system 100 including a base station 110 and a mobile station 120, the mobile station 120 applying techniques for channel estimation as described in the following. The multipath channel via which a radio wave propagates from a base station 110 to a mobile station 120 can be viewed as transmitting the original (line-of-sight) wave pulse 101 through a number of multipath components 101, 102, 103 due to obstacles 112, 113. Multipath components are delayed copies of the original transmitted wave traveling through a different echo path, each having a different magnitude, phase, and time-of-arrival at the receiver. Since each component contains the original information, if the magnitude, phase and time-of-arrival (phase) of each component are computed at the receiver through a process called channel estimation, then all the components can be added coherently to improve the information reliability. The pair of magnitude and phase can be referred to as complex weights. The delay of, for example, the third multipath component 103 depicted in FIG. 1 may be longer than the Cyclic Prefix used for signal transmission. When the mobile station 120 is implementing techniques for channel estimation as described herein, ISI and ICI can be detected and the mobile station 120 is able to accurately estimate the channel.

The methods and devices described herein may be implemented in multicarrier systems applying cyclic prefix and in wireless communication OFDM systems using CP. In a wireless communication OFDM system, the transmitted OFDM symbols may be generated by simultaneous data transmission over a set of orthogonal subcarriers. The OFDM symbols may then be sent over the wireless channel whose multipath nature determines multiple copies of the same symbol to arrive delayed at the receiver. This determines the previous symbols to interfere with the current one, i.e. giving rise to inter-symbol interference (ISI), but also destroys the orthogonality between subcarriers of the current OFDM symbol, i.e. creating inter-carrier interference (ICI).

In order to avoid ISI and ICI, at transmission, the OFDM symbol may be prepended a cyclic prefix (CP), that may consist of a copy of its last samples, and whose length should be at least as long as the maximum excess delay of the channel. A long CP protects against ISI/ICI in a diverse range of scenarios, where the channels implicitly exhibit a wide range of maximum excess delay, but comes at the cost of reduced spectral efficiency. Long channels are the result of the heterogeneities in the propagation environment, e.g. hills, mountains, large water masses or skyscrapers in the urban areas. Therefore, choosing an appropriate length for the CP is always a tradeoff. As a result, there are situations in which the CP is shorter than the channel maximum excess delay. In this case, both ISI and ICI degrade the receiver's performance, otherwise unaware of these phenomena. The degradation is the combined result of two different effects, i.e. pilot-based channel estimation errors and equalization impaired by ISI/ICI. The causes of the pilot-based channel estimation errors are two-fold. On one hand, in an insufficient CP OFDM system, the resolution the pilots provide is insufficient for the estimator to accurately resolve the channel response. On the other hand, since the channel estimators assume no power leakage between adjacent subcarriers, they employ a biased signal model in which the transmitted symbols' vector is modulated by a diagonal channel matrix. The equalization becomes biased due to the use of the mismatched signal model and the inaccurate channel estimates resolved by the channel estimation block prior to equalization.

Figure 2:
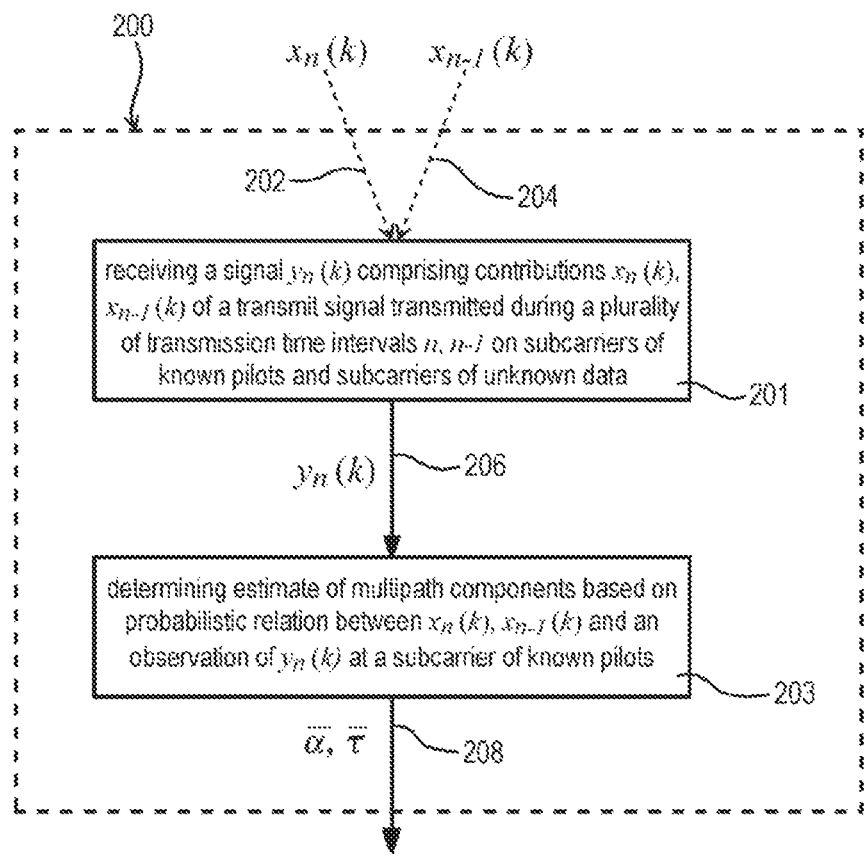
FIG. 2 is a schematic diagram of a method 200 of estimating a channel for mobile systems with insufficient CP length in accordance with the disclosure.

FIG. 2 is a schematic diagram of a method 200 of estimating a channel for mobile systems with insufficient CP length, wherein the channel includes a plurality of multipath components in accordance with the disclosure.

The method 200 includes an act 201 of receiving a signal 206, $y_n(k)$ including contributions 202, 204 of a transmit signal $x_n[k]$, [k] transmitted during a plurality of transmission time intervals n, n−1 on sub-carriers of known pilots $k \in P_b$ and sub-carriers of unknown data $k \notin P_b$. The method 200 includes an act 203 of determining an estimate 208 of the multipath components $\bar{\alpha}, \bar{\tau}$ based on a probabilistic relation between first contributions 202, 204 of the transmit signal $x_n[k]$, $x_{n-1}[k]$, wherein the first contributions 202, 204 are transmitted during adjacent transmission time intervals n, n−1, and an observation of the received signal 206, $y_n[k]$ at a subcarrier $k \in P_b$ of the known pilots. The probabilistic relation is based on statistical properties of the first contributions 202, 204 of the transmit signal $x_n[k]$, $x_{n-1}[k]$.

The probabilistic relation may be based on a sparse Bayesian learning framework applying a probability density function of the multipath components $\bar{\alpha}, \bar{\tau}$ according to a sparse channel model, e.g. as described below. The probabilistic relation may include a dictionary matrix $\Phi_1$ with respect to the first contributions 202, 204 of the transmit signal $x_n[k]$, $x_{n-1}[k]$, e.g. as described below. The dictionary matrix $\Phi_1$ may depend on the first contributions 202, 204 of the transmit signal $x_n[k]$, $x_{n-1}[k]$ and on a delay vector $\bar{\tau}$, wherein the delay vector $\bar{\tau}$ includes delay values of the plurality of multipath components $\bar{\alpha}, \bar{\tau}$, e.g. as described below.

The probabilistic relation may include a multiplicative combination between the dictionary matrix $\Phi_1$ and a channel weights vector $\bar{\alpha}$, wherein the channel weights vector $\bar{\alpha}$ includes channel weights of the plurality of multipath components $\bar{\alpha}, \bar{\tau}$. In particular, the probabilistic relation may be according to: $y_n[k] = [\Phi_1(x_n, x_{n-1}, \bar{\tau})]_k \bar{\alpha} + \xi$, wherein $y_n[k]$ denotes the signal received at a transmission time interval n on a pilot subcarrier k, $\Phi_1$ denotes the dictionary matrix with respect to subcarrier k, $x_n, x_{n-1}$ denote the first contributions of the transmit signal transmitted during the $n^{th}$ and the $(n-1)^{th}$ transmission time interval, $\bar{\tau}$ denotes the delay vector, $\bar{\alpha}$ denotes the channel weights vector, and $\bar{\xi}$ denotes a noise vector.

The probabilistic relation may be based on a probabilistic model of the channel weights, the delay values and a noise precision. The probabilistic relation may be based on hierarchical prior modeling of the channel weights, the delay values and the noise precision, e.g. as described below.

The method 200 may further include determining approximate probability density functions of the channel weights, the delay values and the noise precision based on a mean field belief propagation framework, e.g. as described below. The method 200 may further include determining the approximate probability density functions of the channel weights, the delay values and the noise precision based on a von Mises probability density function, e.g. as described below. The method 200 may further include iterating between estimating the channel weights, the delay values and the noise precision.

The probabilistic relation may be based on first and second order statistics of the contributions 202, 204 of the transmit signal $x_n[k], x_{n-1}[k]$. The probabilistic relation may be based on first and second order moments of the contributions 202, 204 of the transmit signal $x_n[k], x_{n-1}[k]$, e.g. as illustrated below. The method 200 may further include determining the first and second order moments based on a known pilot pattern for sub-carriers $k \in P_b$ of known pilots and based on a constant for the sub-carriers $k \notin P_b$ of unknown data.

The method 200 may further include an act of determining the first and second order moments according to:

$$\varepsilon_{p(x_n, x_{n-1})}(x_b[k]) = \begin{cases} x_b[k], & \text{if } k \in P_b \\ 0, & \text{otherwise} \end{cases}$$

$$\varepsilon_{p(x_n, x_{n-1})}(|x_b[k]|^2) = \begin{cases} |x_b[k]|^2, & \text{if } k \in P_b \\ 1, & \text{otherwise} \end{cases},$$

wherein $\varepsilon_{p(x_n, x_{n-1})}(x_b[k])$ denotes the first order moment, $\varepsilon_{p(x_n, x_{n-1})}(|x_b[k]|^2)$ denotes the second order moment, $x_n, x_{n-1}$ denote the first contributions of the transmit signal transmitted during the $n^{th}$ and the $(n-1)^{th}$ transmission time interval, k denotes the sub-carrier index, wherein $k \in P_b$ indicates the known pilot sub-carriers and $b \in \{n-1, n\}$ is an index of the transmission time interval.

The mobile system may include an LTE OFDM transmission for which a maximum excess delay of the channel is larger than the cyclic prefix length.

The known pilots may correspond to cell-specific reference symbols (CRS) of an LTE frame. The known pilot subcarriers and/or the unknown data subcarriers may be part of an LTE frame, sub-frame or slot comprising data and/or control symbols in addition to the reference symbols. The different transmission time intervals n, n−1 may be times at which the contributions $x_n(k)$ 202 and $x_{n-1}(k)$ 204 are transmitted at a transmitter. The different time intervals n, n−1 may be different symbol times of an LTE frame, sub-frame or slot. For example, the time interval n of a first contribution $x_n(k)$ 202 of the transmit signal and the time interval n−1 of a second contribution $x_{n-1}(k)$ 204 of the transmit signal may be times of succeeding LTE frames or sub-frames or slots or may be times of succeeding symbols in an LTE frame, sub-frame or slot. The contributions of the transmit signal may include two, three, four or more contributions of the transmit signal transmitted during two, three, four or more adjacent or non-adjacent time intervals.

The receive symbol $y_n$ 206 may comprise inter-symbol interference and/or inter-carrier interference due to the transmission of the different contributions of the transmit signal transmitted during different time intervals.

There are different methods for determining (see act 203) an estimate of the multipath components $\bar{\alpha}, \bar{\tau}$ of the channel $g(\tau)$ based on the contributions $x_n(k)$ 202 and $x_{n-1}(k)$ 204 of the transmit signal and based on an observation of the receive symbol $y_n(k)$ 206 as described in the following. In order to jointly estimate the variables of interest, i.e. channel complex weights, noise variance, data symbols, variational inference approaches may be used and the posterior pdfs of the unknown quantities given the set of observations may be computed. For example, a Belief Propagation (BP) algorithm may be employed to resolve the unknown random variables of the system. The BP algorithm yields good approximations of the marginal distributions of the hidden variables that are also called "beliefs". To reduce complexity, approximations in the computations of the beliefs may be applied. The computations associated with the continuous random variables updates may employ a Mean Field (MF) approximation. The MF algorithm outputs the approximate pdfs of the hidden random variables of interest by assuming that the global pdf is fully factorizable. The solution of the method is the pdf which minimizes the Kullback-Liebler divergence between the approximated and the true pdf. Since both MF and BP have an iterative nature, similar to message exchanges between nodes of a factor graph, the joint framework may be formulated as a message-passing algorithm.

Estimating (see act 203) the channel $g(\tau)$ may be based on a message-passing design optimized for insufficient CP OFDM systems using the unified MF-BP framework. In order to perform time-domain channel estimation, the CIR may be considered as being sparse, i.e. having a few non-zero multipath components. Making use of this finding, determining (see act 203) the estimate of the multipath components may use compressive sensing techniques, which consist on finding sparse CIR estimates which maximize an objective function, for example based on l1-norm constrained minimization problems, such as Least Absolute Shrinkage and Selection Operator (LASSO), Basis Pursuit (BP), Orthogonal Matching Pursuit (OMP) or maximum-a-posteriori (MAP) methods such as sparse Bayesian learning (SBL) which uses a probabilistic modeling of the channel weights that encourages sparse CIR representations. For tractability purposes, these pdfs may be modeled by introducing hyperpriors over the weights, and thus obtaining two-(2L) or three-layers (3L) hierarchical models.

The method 200 for channel estimation is robust against ISI and ICI that occur when the channel MED exceeds the CP duration. The method 200 is able to compute more accurate estimates of the channel responses (CIR and channel frequency response (CFR)) compared to traditional PB estimation methods by exploiting the structure of the interference. Specifically, it computes estimates of the gain and delay of the multipath components in the CIR by: Explicitly estimating the interference that each pilot symbol causes on all received pilot signals accounting for the power leaked by data-symbols on the pilot subcarriers, by assuming certain first- and second-order statistics of the data symbols as described in the following, and iteratively refining the CIR and noise precision estimates.

In the following sections, an example for determining 203 an estimate 208 of the multipath components $\bar{\alpha}, \bar{\tau}$ of the multipath components based on a probabilistic relation between first contributions 202, 204 of the transmit signal $x_n[k]$, $x_{n-1}[k]$ is described.

In n-th transmission interval, a vector $u_n \in \{0,1\}^K$ of information bits is encoded with a code rate R and interleaved into the vector $c_n \in \{0,1\}^{K/R}$. The code vector $c_n$ is next modulated onto a vector of complex symbols that are interleaved with pilot symbols producing the symbol vector $x_n \in \mathbb{C}^N$. The subset of indices corresponding to pilot and data symbols in the n-th signaling interval is denoted as $P_n$ and $D_n$ respectively. The symbol vector $x_n$ is passed through an inverse DFT block to yield $s_n = F^H x_n$, to which a μ-samples long cyclic prefix (CP) is prepended. The resulting samples are modulated using a transmit sinc filter $$\psi_{tx}(t) = F^{-1}\{rect(f)\}, \sup\ p(rect) = \left[-\frac{1}{2T_s}, \frac{1}{2T_s}\right]$$

yielding the OFDM waveform transmitted in the n-th signaling interval:

$$s_n(t) = (\tilde{s}_n * \psi_{tx})(t) \quad (1)$$

where $\tilde{s}_n(t) = \Sigma_{i=-\mu}^{N-1} s_n[i]\delta(i+n(\mu+N))T_s)$, $T_s$ represents the sampling time, and $s_n[-i] = s_n[N-i]$, for $i \in [1:\mu]$. The transmitted signal over a block of B consecutive OFDM waveforms reads $s(t) = \Sigma_{n=0}^{n=B-1} s_n(t)$. The channel impulse response (CIR), constant over a signaling block, contains $\bar{L}$ multipath components, with gains $\bar{\alpha} \in \mathbb{C}^{\bar{L}}$ and delays $\bar{\tau} \in \mathbb{R}^{\bar{L}}$. The CIR during all $n \in [0:B-1]$ signaling intervals in the block—each spanning a $\Delta_n = [((n-1)\mu+nN)T_s, (n\mu+(n+1)N)T_s)$, reads $$\bar{g}(t,\tau) = \bar{g}(\tau) = \sum_{l=0}^{\bar{L}-1} \bar{\alpha}[l]\delta(\tau - \bar{\tau}[l]).$$

Note that $\bar{\tau}[l]$ can exceed the CP duration $\mu T_s$, but is restrained according to: $\bar{\tau}[\bar{L}-1] \le (\mu+N)T_s$.

The receiver observes the convolution of the transmit signal with the channel response and corrupted by AWGN: $s(t) * \bar{g}(t,\tau) + w(t)$. To this signal, it applies the receive filter $\psi_{rx}$ matched to the transmit one. The resulting signal reads $$r(t) = \sum_{n=0}^{B-1} \tilde{s}_n * \bar{g} * \phi)(t) + v(t), \quad (3)$$

where $\phi(t) = (\psi_{tx} * \psi_{rx})(t)$ and $v(t) = (w * \psi_{rx})(t)$. Since $\bar{\tau}[\bar{L}-1] \le (\mu+N)T_s$, $r(t)$ in $\Delta_n$ contains the noisy versions of $s_n(t)$ and $s_{n-1}(t)$ modulated by $\bar{g}(t-\tau)$. After discarding the first μ samples of $r(t)$ in $\Delta_n$, the remaining ones are collected in the vector of observations $r_n \in \mathbb{C}^N$. This vector is passed through a DFT block to yield $y = Fr_n + \xi$ with $\xi = Fv$.

To illustrate the dependency of $y_n$; $n=[0:B-1]$ on the CIR the following representation is used:

$$y_n = \overline{\Phi_1 \alpha} + \xi, \quad (4)$$

where $\overline{\Phi}_1 = (X_n \sqrt{N} F + \Xi_n) \overline{\Phi}$. The receive signal in (4) becomes $$y_n = \left(X_n + \frac{1}{\sqrt{N}} \Xi_n F^H\right)\overline{C\alpha} + \xi. \quad (5)$$

Demodulating the receive signal (4), i.e. $t_n = X_n^{-1} y_n$, one obtains $t_n = (I_N + \overline{E}_n)\overline{C\alpha} + \varepsilon_n$ where $$\overline{E}_n = \frac{1}{\sqrt{N}} X_n^{-1} \Xi_n F^H$$

and $\varepsilon_n = X_n^{-1} \xi$. The observed signal at pilot positions, $t_n^{P_n}$, is obtained by retaining the lines indexed by the elements of $P_n$ and reads $$t_n^{P_n} = \overline{T}^{P_n} \overline{C\alpha} + \varepsilon_n \quad (6)$$

Where $\overline{T}^{P_n} = S^{P_n} = \overline{E}_n^{P_n}$ and the matrix $S^{P_n} \in \mathbb{C}^{card(P_n) \times N}$ selects the lines of $\overline{C}$ corresponding to the pilot positions. During B signaling intervals, the observed signal at pilot positions becomes $$o = \overline{TC\alpha} + \varepsilon \quad (7)$$

where the following is defined:

$$o = [(t_0^{P_0})^T | \ldots | (t_{B-1}^{P_{B-1}})^T]^T \quad (8a)$$

$$\overline{T} = [(\overline{T}^{P_0})^T | \ldots | (\overline{T}^{P_{B-1}})^T]^T \quad (8b)$$

The pdf of the noise vector $\varepsilon$ is $p(\varepsilon) = p(\varepsilon) = CN(\varepsilon; 0, \lambda^{-1} I_P)$, where $P = \Sigma_{n=0}^{B-1} card(P_n)$. In (7), the unknown quantities are: the channel coefficients $\bar{\alpha}$ and their corresponding delays $\bar{\tau}$, the data symbols $x_n$, $n \in [0:B-1]$ in the matrix T, and the noise precision $\lambda$.

To obtain estimates of the channel response, the assumption is made that the CIR is sparse, i.e. composed of a few nonzero multipath components. Consequently, a sparse channel vector $\alpha \in \mathbb{C}^L$ and the corresponding delays $\tau$ are computed, which approximate the true CIR $\bar{\alpha}$ and the delays $\bar{\tau}$, respectively. To that end, the sparse Bayesian learning framework is used to model the pdf of the sparse channel vector and a hierarchical prior model is used for $\alpha$: $p(\alpha) = \int p(\alpha, \gamma) d\gamma$, where $p(\alpha|\gamma) = CN(\alpha; 0, \Gamma)$, $\Gamma = diag(\gamma)$, $p(\gamma) = \Pi_{l=0}^{L-1} Ga(\gamma[l]; \varepsilon, \eta)$.

Using the above approximation, the probabilistic model becomes $$o = TC\alpha + \varepsilon \quad (9)$$

where the matrices T, C are computed similar to $\overline{T}$, $\overline{C}$ by replacing $\bar{\tau}$ by $\tau$. Note that unlike traditional models used in compressed sensing, the dictionary matrix in (9) is perturbed by the interference modeled in the elements of $\overline{E}_n^{P_n}$ contained in T. From equation (9), the joint pdf of the system variables reads $$p(\alpha, \gamma, \tau, \lambda, x_0, \ldots, x_{B-1}, o) = \quad (10)$$

$$p(o|\alpha, \tau, \lambda, x_0, \ldots, x_{B-1}) \cdot p(\alpha|\gamma) p(\gamma) p(\lambda) p(\tau) \prod_{n=0}^{B-1} p(x_n),$$

where $p(o|\alpha, \tau, \lambda, x_0, \ldots, x_{B-1}) = CN(o; (T+\Delta T)\alpha, \lambda^{-1} I_P)$. The mean field (MF) framework is used to compute approximate pdfs, also called beliefs, of the variables of interest.

The belief of the channel weights are:

$$q(\alpha) = CN(\alpha, \mu_\alpha, \Sigma_\alpha) \quad (11a)$$

$$\Sigma_\alpha^{-1} = \langle \lambda \rangle_{q(\lambda)} \langle (TC)^H TC \rangle_{q(\tau) \prod_{n=0}^{B-1} q(x_n)} + \langle \Gamma^{-1} \rangle_{q(\gamma)} \quad (11b)$$

$$\mu_\alpha = \langle \lambda \rangle_{q(\lambda)} \Sigma_\alpha \langle (TC)^H \rangle_{\prod_{n=0}^{B-1} q(x_n)} o. \quad (11c)$$

The belief of the noise precision is $$q(\lambda) = Ga(\lambda; P, \langle \|o - TC\alpha\|_2^2 \rangle_{q(\alpha) q(\tau) \prod_{n=0}^{B-1} q(x_n)}). \quad (12)$$

The belief of the delay vector factorizes as $\prod_{l=0}^{L-1} q(\tau[l])$ and $q(\tau[l]) = p(\tau[l]) q_l$ according to:

$$q_l = \exp \langle \ln(p(o|\alpha,\tau,\lambda,x_0,\ldots,x_{B-1})) \rangle_{\prod_{n=0}^{B-1} q(x_n) q(\alpha) q(\lambda)} \prod_{k \ne l} q(\tau[k]) \quad (13)$$

The second factor $q_l$ in (13) is computed as $$q_l = \exp(\mathcal{R}e\{(a_l + b_l)^H C_l\}) \quad (14)$$

$$a_l = 2 \langle \lambda \rangle_{q(\lambda)} \left\langle \alpha^*[l] T^H \left( o - \sum_{i \ne l} TC_i \alpha[i] \right) \right\rangle_{q(x_n) q(\alpha) \prod_{k \ne l} q(\tau[k])}$$

$$b_l[k] = -\sum_{p > k}^{N-1} 2 \langle \lambda \rangle_{q(\lambda)} \langle |\alpha^*[l]|^2 \rangle_{q(\alpha)} R[k + p, k],$$

where $C_l$ designates the l-th column of C and R equals $$\langle T^H T \rangle_{\prod_{n=0}^{B-1} q(x_n)}.$$

To find the delay that maximizes equation (13), many different techniques may be applied. A first exemplary one is to find the delay that maximizes equation (13) by using any numerical method. Other techniques are applicable as well.

The method 200 as described herein may be implemented in a processing circuit 400 as described below with respect to FIG. 3.

Figure 3:
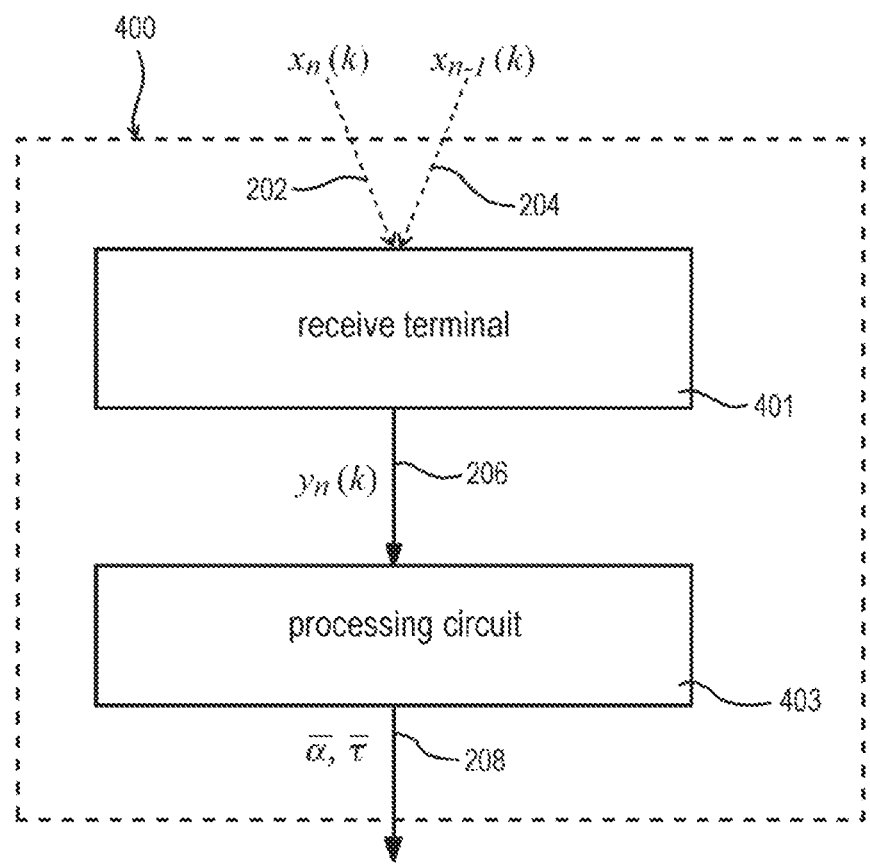
FIG. 3 is a schematic diagram of a channel estimation device 400 in accordance with the disclosure.

FIG. 3 is a schematic diagram of a channel estimation device 400 in accordance with the disclosure. The channel estimation device 400 includes a receive terminal 401 and a processing circuit 403. The receive terminal 401 is configured to receive a signal $y_n[k]$ including contributions 202, 204 of a transmit signal $x_n[k]$, $x_{n-1}[k]$ transmitted during a plurality of transmission time intervals n, n−1 on sub-carriers $k \in P_b$ of known pilots and sub-carriers $k \notin P_b$ of unknown data, e.g. as described with respect to the first block 201 of the method 200 depicted in FIG. 2. The processing circuit 403 is configured to determine an estimate of the multipath components $\bar{\alpha}, \bar{\tau}$ based on a probabilistic relation between first contributions 202, 204 of the transmit signal $x_n[k]$, $x_{n-1}[k]$, wherein the first contributions (202, 204) are transmitted during adjacent transmission time intervals n, n−1, and an observation of the received signal $y_n[k]$ at a subcarrier $k \in P_b$ of the known pilots, e.g. as described with respect to the second block 203 of the method 200 depicted in FIG. 2. The probabilistic relation is based on statistical properties of the first contributions 202, 204 of the transmit signal $x_n[k]$, $x_{n-1}[k]$, e.g. as described above with respect to FIG. 2.

Figure 5:
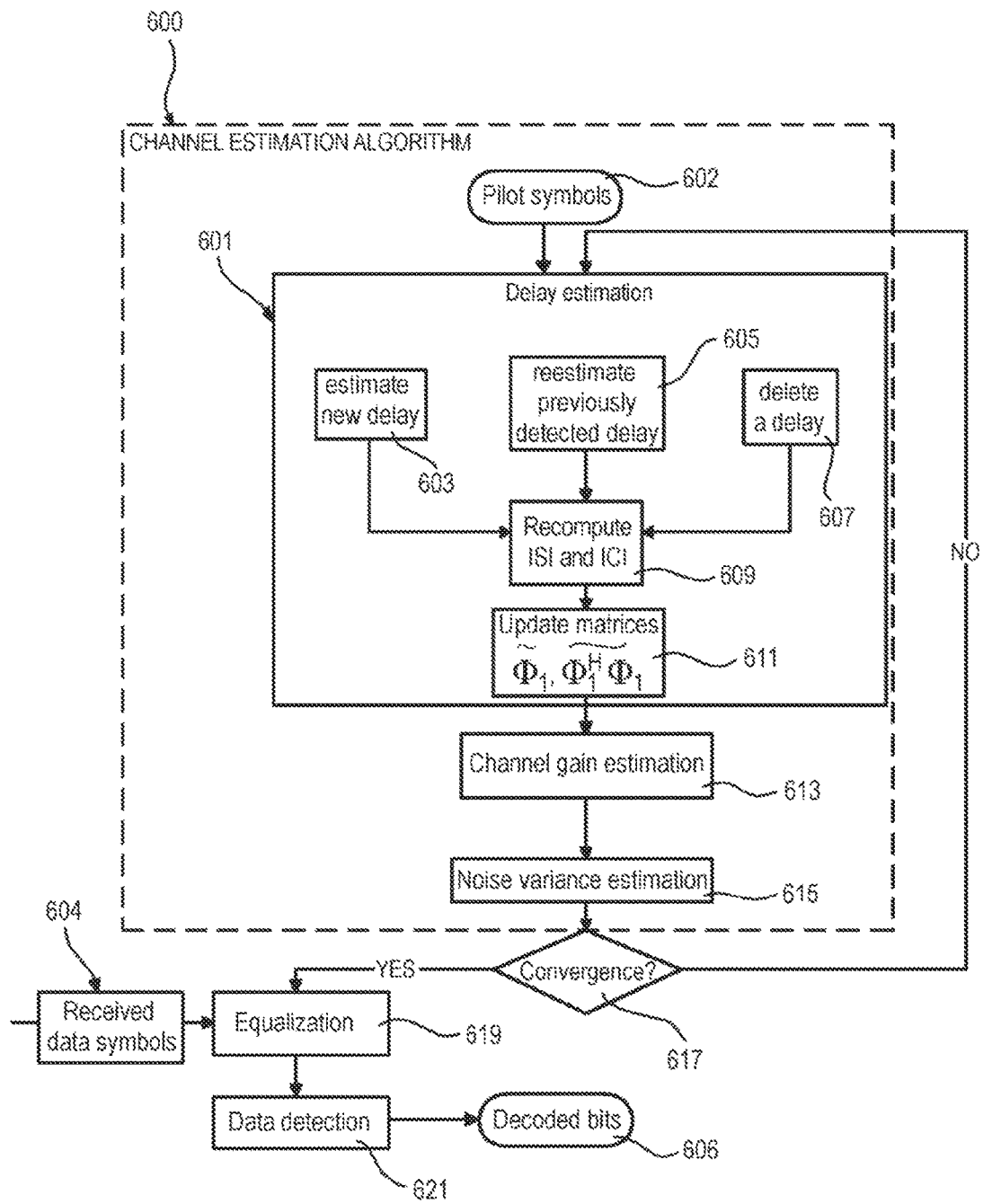
FIG. 5 is a schematic diagram of a channel estimation algorithm 600 in accordance with the disclosure.

The channel estimation device 400 may include a matrix processing unit for determining a dictionary matrix $\Phi_1$ with respect to the first contributions 202, 204 of the transmit signal $x_n[k]$, $x_{n-1}[k]$, e.g. as described with respect to FIG. 2 or FIG. 5. The channel estimation device 400 may include a statistical processing circuit for determining first and second order moments of the first contributions 202, 204 of the transmit signal $x_n[k]$, $x_{n-1}[k]$, e.g. as described with respect to FIG. 2 or FIG. 5. The matrix processing unit may determine the dictionary matrix $\Phi_1$ based on the first and second order moments of the first contributions 202, 204 of the transmit signal $x_n[k]$, $x_{n-1}[k]$, e.g. as described with respect to FIG. 2 or FIG. 5.

The channel estimation device 400 may further include a multiplicative processing unit for determining a multiplicative combination of the dictionary matrix $\Phi_1$ and a channel weights vector $\bar{\alpha}$, e.g. as described with respect to FIG. 2 or FIG. 5. The channel estimation device 400 may further include an additive processing unit for adding a noise vector to the multiplicative combination of the dictionary matrix $\Phi_1$ and the channel weights vector $\bar{\alpha}$, e.g. as described with respect to FIG. 2 or FIG. 5.

In the following, an example of a processing circuit 403 in a channel estimation device 400 is described. To illustrate the behavior of the processing circuit 403 in the channel estimation device 400, an OFDM (orthogonal frequency division multiplex) system with N subcarriers is considered, out of which P are pilots. At n-th transmission interval, the pilots are placed according to the pattern $P_n$. Each OFDM symbol is prepended a cyclic prefix (CP) consisting of $N_{CP}$ samples. The channel impulse response $\bar{g}$ consisting of $\bar{L}$ multipath components with gains and delays collected in the vectors $\bar{\alpha}$ and $\bar{\tau}$ may be defined as:

$$\bar{g}(t,r) = \Sigma_{l=0}^{\bar{L}-1} \bar{\alpha}[l] \delta(\tau - \bar{\tau}[i]).$$

where $\bar{\tau}[0] < \ldots < \bar{\tau}[\bar{L}-1]$. The channel maximum excess delay (MED) may be defined as $$T_{MED} = \bar{\tau}[\bar{L}-1] - \bar{\tau}[0].$$

When $T_{MED} > T_{CP}$, the r-th received signal at k-th subcarrier, $y_n[k]$, contains the contributions of the signals transmitted during the n ($x_n[p], p \in [1,N]$) and n−1 ($x_{n-1}[v]$, $\forall v \in [1,N]$) transmission intervals on all subcarriers, corrupted by AWGN $\xi$, i.e.

$$y_n[k] = [\Phi_1(x_n, x_{n-1}, \bar{\tau})]_k \bar{\alpha} + \xi. \quad (15)$$

$\Phi_1(x_n, x_{n-1}, \bar{\tau})$ is used to denote that the matrix $\Phi_1$ depends on $x_n, x_{n-1}, \bar{\tau}$.

Some simple CIR estimators are designed based on the assumption that $T_{MBD} \le T_{CP}$, i.e. they assume that the received signal at time instance n and subcarrier k contains only the noisy contribution of the transmit signal during n-th transmission interval and on the same subcarrier. In other words, they assume a mismatched model:

$$y_n[k] = [\Phi_2(x_n[k], \bar{\tau})]_k \bar{\alpha} + \xi. \quad (16)$$

By $[\Phi_i]_k$ the k-th row of the matrix $\Phi_i$ is denoted. Note that simple estimators use the mismatched model (16)—in which both ISI and ICI are ignored—and compute estimates of $\bar{\alpha}$ corrupted by interference.

The processing circuit 403 in the channel estimation device 400 may compute estimates (i.e. expected values) of $\bar{\alpha}, \bar{\tau}$ by:

1. Using the signal received at pilot subcarriers $y_n[k], k \in P_n$;
2. Using an observation model which approximates $\Phi_1$ in (15);
3. Iterating between estimating channel gains, the delays, and the noise precision; and
4. Assuming a probabilistic model of the channel weights, the delays and the noise precision.

Additionally, the pilot-based (PB) channel estimation as performed by the processing circuit 403 may be applied to blocks of several OFDM symbols by building larger matrices $\Phi_1$ that generalize the signal model in (15) to include observations $y_n[k], k \in P_n, n \in [0:B-1]$, where B is the block size.

To compute the estimates of $(\overline{\alpha}, \overline{\tau})$ in equation (16), the disclosed PB channel estimator as it may be implemented in the processing circuit 403 may compute $\Phi_1$ and $\Phi_1^H \Phi_1$. Computing the entries of these matrices (see eq. (15)) may require knowledge of the unknown transmitted symbols $x_{n-1}, x_n$. Instead of these matrices, approximations thereof may be used relying on statistical properties of the transmitted data symbols, for example as follows:

$$\Phi_1 \cong \tilde{\Phi}_1 = \varepsilon_{p(x_n, x_{n-1})}(\Phi_1) \quad (17)$$

$$\Phi_1^H \Phi_1 \cong \widetilde{\Phi_1^H \Phi_1} = \varepsilon_{p(x_n, x_{n-1})}(\Phi_1^H \Phi_1) \quad (18)$$

where $\varepsilon_{p(x)}(x)$ denotes the expected value of x with respect to the pdf p(x).

To compute $\tilde{\Phi}_1$, $\widetilde{\Phi_1^H \Phi_1}$, the first- and the second-order moments of $x_{n-1}, x_n$ may be assumed as:

$$\varepsilon_{p(x_n, x_{n-1})}(x_b[k]) = \begin{cases} x_b[k], & \text{if } k \in P_b \\ 0, & \text{otherwise} \end{cases} \quad (19.a)$$

$$\varepsilon_{p(x_n, x_{n-1})}(|x_b[k]|^2) = \begin{cases} |x_b[k]|^2, & \text{if } k \in P_b \\ 1, & \text{otherwise} \end{cases} \quad (19.b)$$

$$\forall b \in \{n-1, n\}.$$

An exemplary structure of a channel estimator as described above, together with an exemplary structure of the receiver implementing the estimator is detailed in FIG. 5 described below.

The channel estimation device 400 may implement a low complexity pilot-based channel impulse response estimator capable of estimating multipath components arriving with delays larger than the CP duration in OFDM. The LTE OFDM systems operating over such channels exhibit inter-symbol and inter-carrier interference which encumber the receiver performance. The channel estimation device 400 may compute both the channel gains and the delays using Bayesian inference. To cope with ICI and ISI, the pilot-based channel estimation device 400 may exploit the particular structure of the interference when estimating the channel gains and delays. The channel estimation device 400 has lower complexity than an iterative, data-aided scheme. In addition, the channel estimation device 400 is robust in the sense that it is able to cope with both cases of sufficient and insufficient CP duration, without any special configuration of the algorithm running in the processing circuit 403, e.g. the algorithm 600 described below with respect to FIG. 5 or the methods 200, 500 described below with respect to FIGS. 2 and 4.

Figure 4:
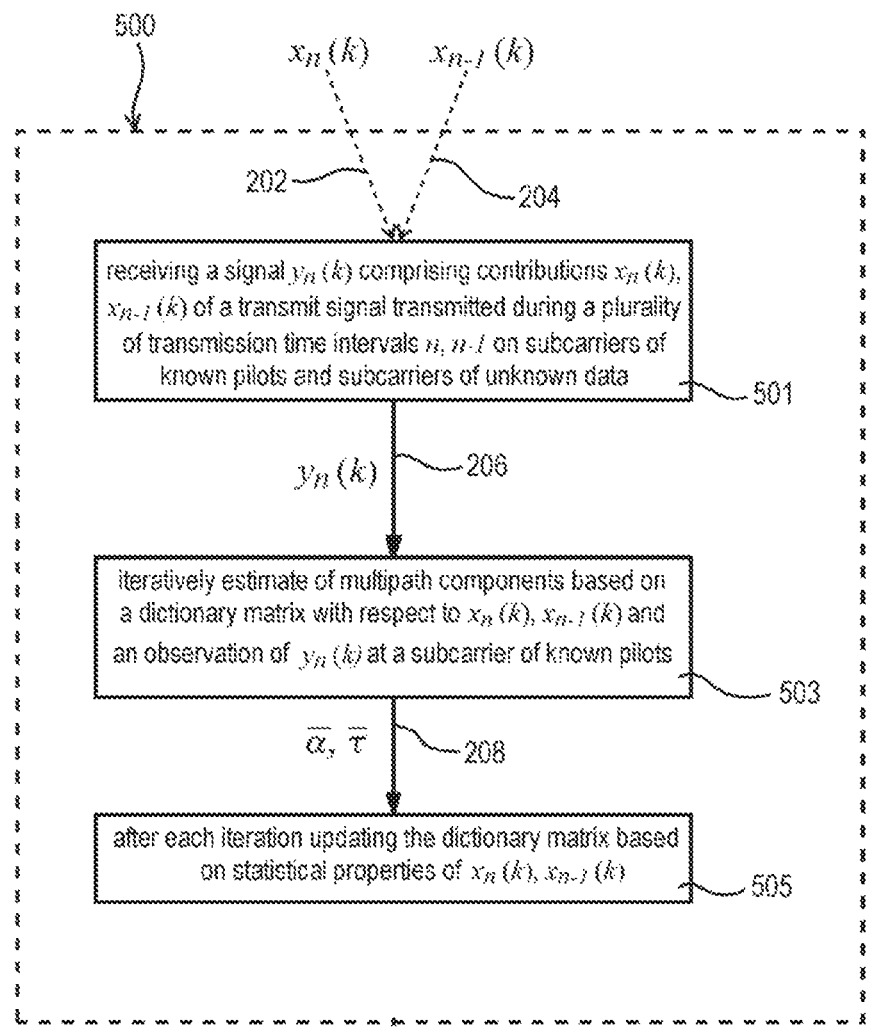
FIG. 4 is a schematic diagram of a method 500 of estimating a channel for mobile systems with insufficient CP length based on a dictionary matrix in accordance with the disclosure.

FIG. 4 is a schematic diagram of a method 500 of estimating a channel for mobile systems with insufficient CP length based on a dictionary matrix in accordance with the disclosure, wherein the channel comprises a plurality of multipath components $\overline{\alpha}, \overline{\tau}$.

The method 500 includes an act 501 of receiving a signal $y_n(k)$ comprising contributions 202, 204 of a transmit signal $x_n[k], x_{n-1}[k]$ transmitted during a plurality of transmission time intervals n, n−1 on sub-carriers $k \in P_b$ of known pilots and sub-carriers $k \notin P_b$ of unknown data, e.g. as described above with respect to FIG. 2. The method 500 includes an act 503 of iteratively determining an estimate of the multipath components $\overline{\alpha}, \overline{\tau}$ based on a dictionary matrix $\Phi_1$ with respect to first contributions 202, 204 of the transmit signal $x_n[k], x_{n-1}[k]$, wherein the first contributions 202, 204 are transmitted during adjacent transmission time intervals n, n−1, and based on an observation of the received signal $y_n[k]$ at a subcarrier $k \in P_b$ of the known pilots. The method 500 further includes an act 505 of after each iteration updating the dictionary matrix $\Phi_1$ based on statistical properties of the first contributions 202, 204 of the transmit signal $x_n[k], x_{n-1}[k]$, e.g. as described with respect to FIG. 2, 3 or FIG. 5.

The method 500 may further include an act 505 of updating the dictionary matrix $\Phi_1$ based on a first order moment of the first contributions 202, 204 of the transmit signal $x_n[k], x_{n-1}[k]$, and an act of updating a product of an Hermitian conjugate of the dictionary matrix $\Phi_1$ and the dictionary matrix $\Phi_1$ based on a second order moment of the first contributions 202, 204 of the transmit signal $x_n[k], x_{n-1}[k]$, e.g. as described with respect to FIG. 2 or FIG. 3.

The method 500 may further include an act 503 of iteratively determining the estimate of the multipath components $\overline{\alpha}, \overline{\tau}$ until a difference between two consecutive noise variance estimates is smaller than a threshold value.

FIG. 5 is a schematic diagram of a channel estimation algorithm 600 in accordance with the disclosure. The channel estimation algorithm 600 may run on a processing circuit 403 as described above with respect to FIG. 3.

The channel estimation algorithm 600 may take as input the set of pilot symbols 602 and may sequentially estimate each multipath component's gain and delay in a delay estimation block 601. Using variational Bayesian inference, the delay estimation block 601 may estimate the delay of a candidate multipath component, e.g. by estimating a new delay 603, re-estimating a previously detected delay 605, or deleting a delay 607. The computed delays may be used to re-compute ISI and ICI 609. The algorithm 600 may then rebuild the interference matrices, e.g. from equations (17) and (18) as described above with respect to FIG. 3. Based on updating 611 these interference matrices the updated channel coefficients (gains) 613 and noise variance 615 can be estimated. Once the update of all the variables associated with the candidate multipath component is finished, the estimator may decide whether the candidate component should be kept or discarded. If the component is kept, the noise variance and all previously estimated channel coefficients and delays may be updated. These operations may be repeated until the estimated noise variance has converged 617, e.g. the difference between two consecutive estimates of the noise variance falls below a threshold. The channel estimates may be applied to the received data symbols 604 in an equalizer 619. The equalized data symbols may be provided to data detection 621 for providing decoded bits 606.

The disclosed channel estimation algorithm 600 is a low complexity pilot-based (PB) algorithm for estimating channel impulse responses (CIR) that may be applied in LTE OFDM systems with insufficient (cyclic prefix) CP length. These situations arise when the maximum excess delay (MED) of the channel is larger than the CP duration. In such conditions, inter-carrier (ICI) and inter-symbol (ISI) interference occur. Consequently, each pilot symbol may be interfered by the complex symbols mapped onto all subcarriers of the current and previous OFDM symbols. In contrast to simple PB channel estimators that ignore ISI and ICI, which—as a result—severely affects the quality of the computed estimates and causes an overall degradation of the receiver's performance, the algorithm 600 as disclosed herein considers both ISI and ICI and therefore has a superior performance as can be seen from FIG. 6 below.

In contrast to data-aided iterative algorithms, which sequentially refine the channel and data estimates and cancel ISI and ICI, however at the cost of high computational complexity, the disclosed algorithm 600 may compute channel estimates exclusively by using the pilot symbols, while being interference-aware, i.e. the algorithm 600 may account for the structure of ISI and ICI when estimating the CIR. These estimates may then be sent to the equalizer and decoder. Additionally, the estimator can be used as a tool for recreating CIRs and replaying them on a lab setup.

Figure 6:
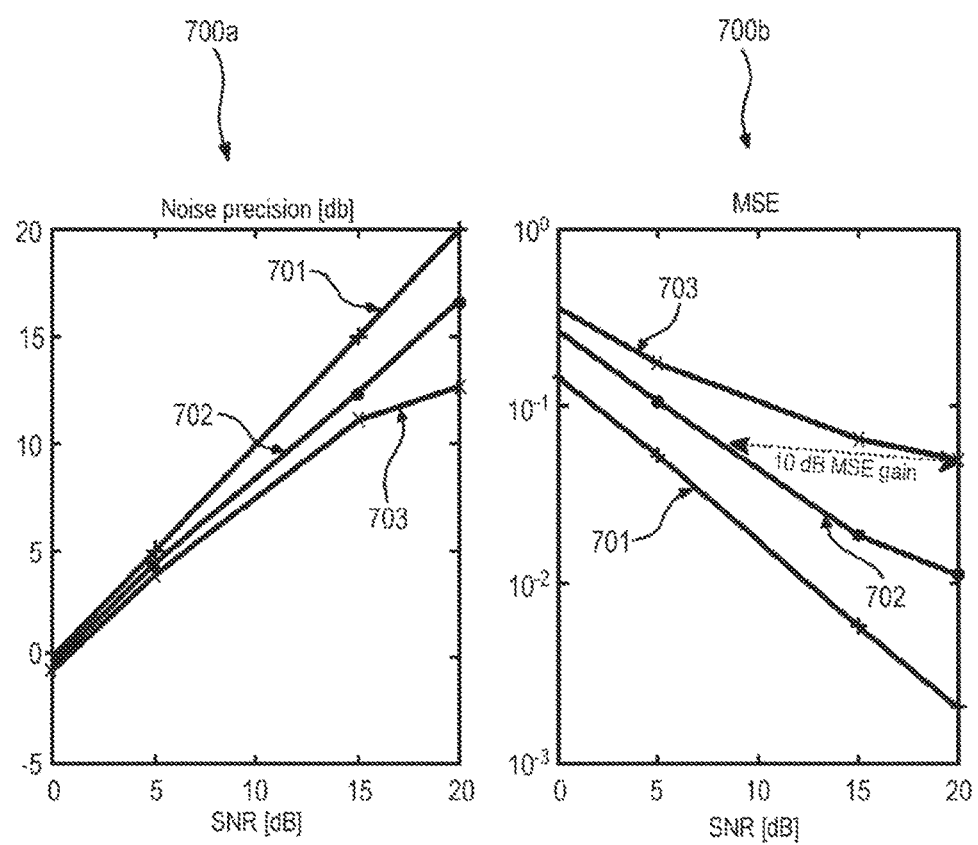
FIG. 6 are performance diagrams of noise precision 700a and mean square error 700b for the method 200 of estimating a channel as shown in FIG. 2 in accordance with the disclosure.

FIG. 6 are performance diagrams of noise precision 700a and mean square error MSE 700b for a PB CIR estimator in accordance with the disclosure, e.g. a device 400 as described above with respect to FIG. 3.

The disclosed PB CIR estimator is compared with a simple PB CIR estimator 701 that ignores ISI and ICI. The performance of the disclosed PB CIR estimator 702 is further benchmarked against a genie-aided estimator 703 which knows the noise variance and the path delays, cancels ISI and ICI perfectly, and only estimates the channel gains. Two performance metrics are used: (1) the mean squared error (MSE) 700b of the estimated CFR, and (2) the estimated noise precision 700a. The latter metric quantifies the residual difference between the received signal and the signal reconstructed using the CFR estimate. Hence, it encompasses deviations due to noise, channel estimation error and unaccounted interference.

In the setup detailed below in Table 1, a 10 dB MSE gain can be obtained (see FIG. 6, MSE 700b) by using the disclosed PB CIR estimator 702 compared with the simple PB CIR estimator 701. The noise precision estimate 700a also reflects this performance gain. These results show that the disclosed PB CIR estimator 702 effectively exploits the structure of the interference to substantially improve the quality of the channel estimate, as compared to a simple estimator 701. Table 1 depicts the applied system and channel parameters of the disclosed PC CIR estimator 702.

TABLE 1 applied system and channel parameters of the disclosed
PC CIR estimator 702
System and channel parameters

| | |
|---|---|
| N [no. subcarriers] | 64 |
| P [no. pilots] | 11 |
| B [no. processed blocks] | 4 |
| TCP [µs] | 4.69 |
| Modulation | QPSK |
| SNR range [dB] | [0 20] |

Channel: The CIR consists of 6 multipath components of equal power and random delays, 3 of which arrive with delays larger than TCP.

EXAMPLES

The following examples pertain to further embodiments. Example 1 is a method of estimating a channel for mobile systems with insufficient cyclic prefix length, wherein the channel comprises a plurality of multipath components, the method comprising: receiving a signal comprising a plurality of contributions of a transmit signal transmitted during a plurality of transmission time intervals on a plurality of sub-carriers of known pilots and a plurality of sub-carriers of unknown data; determining an estimate of the plurality of multipath components based on a probabilistic relation between the plurality of first contributions of the transmit signal, wherein the first contributions are transmitted during adjacent transmission time intervals, and an observation of the received signal at a subcarrier of the known pilots, wherein the probabilistic relation is based on statistical properties of the plurality of first contributions of the transmit signal.

In Example 2, the subject matter of Example 1 can optionally include that the probabilistic relation is based on a sparse Bayesian learning framework applying a probability density function of the plurality of multipath components according to a sparse channel model.

In Example 3, the subject matter of any one of Examples 1-2 can optionally include that the probabilistic relation comprises a dictionary matrix with respect to the plurality of first contributions of the transmit signal.

In Example 4, the subject matter of Example 3 can optionally include that the dictionary matrix depends on the plurality of first contributions of the transmit signal and on a delay vector, wherein the delay vector comprises a plurality of delay values of the plurality of multipath components.

In Example 5, the subject matter of any one of Examples 3-4 can optionally include that the probabilistic relation comprises a multiplicative combination between the dictionary matrix and a channel weights vector, and wherein the channel weights vector comprises a plurality of channel weights of the plurality of multipath components.

In Example 6, the subject matter of Example 5 can optionally include that the probabilistic relation is according to: $y_n[k] = [\Phi_1(x_n, x_{n-1}, \bar{\tau})]_k \bar{\alpha} + \xi$, wherein $y_n[k]$ denotes the signal received at a transmission time interval n on a pilot subcarrier k, $\Phi_1$ denotes the dictionary matrix with respect to subcarrier k, $x_n, x_{n-1}$ denote the plurality of first contributions of the transmit signal transmitted during the $n^{th}$ and the $(n-1)^{th}$ transmission time interval, $\bar{\tau}$ denotes the delay vector, $\bar{\alpha}$ denotes the channel weights vector, and $\xi$ denotes a noise vector.

In Example 7, the subject matter of any one of Examples 5-6 can optionally include that the probabilistic relation is based on a probabilistic model of the plurality of channel weights, the delay values and a noise precision.

In Example 8, the subject matter of Example 7 can optionally include that the probabilistic relation is based on hierarchical prior modeling of the plurality of channel weights, a plurality of the delay values and the noise precision.

In Example 9, the subject matter of any one of Examples 7-8 can optionally include determining approximate probability density functions of the plurality of the channel weights, the plurality of delay values and the noise precision based on a mean field belief propagation framework.

In Example 10, the subject matter of Example 9 can optionally include determining the approximate probability density functions of the plurality of channel weights, the plurality of delay values and the noise precision based on a von Mises probability density function.

In Example 11, the subject matter of any one of Examples 7-10 can optionally include iterating between estimating the plurality of channel weights, the plurality of delay values and the noise precision.

In Example 12, the subject matter of any one of Examples 1-11 can optionally include that the probabilistic relation is based on first and second order statistics of the contributions of the transmit signal.

In Example 13, the subject matter of Example 12 can optionally include that the probabilistic relation is based on first and second order moments of the plurality of contributions of the transmit signal.

In Example 14, the subject matter of Example 13 can optionally include determining the first and second order moments based on a known pilot pattern for the plurality of sub-carriers of known pilots and based on a constant for the plurality of sub-carriers of unknown data.

In Example 15, the subject matter of any one of Examples 13-14 can optionally include determining the plurality of first and second order moments according to:

$$\varepsilon_{p(x_n,x_{n-1})}(x_b[k]) = \begin{cases} x_b[k], & \text{if } k \in P_b \\ 0, & \text{otherwise} \end{cases}$$

$$\varepsilon_{p(x_n,x_{n-1})}(|x_b[k]|^2) = \begin{cases} |x_b[k]|^2, & \text{if } k \in P_b \\ 1, & \text{otherwise} \end{cases},$$

wherein $\varepsilon_{p(x_n,x_{n-1})}(x_b[k])$ denotes the first order moment, $\varepsilon_{p(x_n,x_{n-1})}(|x_b[k]|^2)$ denotes the second order moment, $x_n, x_{n-1}$ denote the first contributions of the transmit signal transmitted during the $n^{th}$ and the $(n-1)^{th}$ transmission time interval, k denotes the sub-carrier index, wherein $k \in P_b$ indicates the known pilot sub-carriers and $b \in \{n-1, n\}$ is an index of the transmission time interval.

In Example 16, the subject matter of any one of Examples 1-15 can optionally include that the mobile system comprises an LTE OFDM transmission for which a maximum excess delay of the channel is larger than the cyclic prefix length.

Example 17 is a channel estimation device, comprising: a receive terminal configured to receive a signal comprising a plurality of contributions of a transmit signal transmitted during a plurality of transmission time intervals on a plurality of sub-carriers of known pilots and a plurality of sub-carriers of unknown data; a processing circuit configured to determine an estimate of the plurality of multipath components based on a probabilistic relation between the plurality of first contributions of the transmit signal, wherein the plurality of first contributions are transmitted during adjacent transmission time intervals, and an observation of the received signal at a subcarrier of the known pilots, wherein the probabilistic relation is based on statistical properties of the plurality of first contributions of the transmit signal.

In Example 18, the subject matter of Example 17 can optionally include a matrix processing unit configured to determine a dictionary matrix with respect to the plurality of first contributions of the transmit signal.

In Example 19, the subject matter of Example 18 can optionally include a statistical processing circuit configured to determine first and second order moments of the plurality of first contributions of the transmit signal.

In Example 20, the subject matter of Example 19 can optionally include that the matrix processing unit is configured to determine the dictionary matrix based on the first and second order moments of the plurality of first contributions of the transmit signal.

In Example 21, the subject matter of any one of Examples 18-20 can optionally include a multiplicative processing unit configured to determine a multiplicative combination of the dictionary matrix and a channel weights vector.

In Example 22, the subject matter of Example 21 can optionally include an additive processing unit configured to add a noise vector to the multiplicative combination of the dictionary matrix and the channel weights vector.

Example 23 is a method of estimating a channel for mobile systems with insufficient cyclic prefix length, wherein the channel comprises a plurality of multipath components, the method comprising: receiving a signal comprising a plurality of contributions of a transmit signal transmitted during a plurality of transmission time intervals on a plurality of sub-carriers of known pilots and a plurality of sub-carriers of unknown data; iteratively determining an estimate of the plurality of multipath components based on a dictionary matrix with respect to the plurality of first contributions of the transmit signal, wherein the plurality of first contributions are transmitted during adjacent transmission time intervals, and based on an observation of the received signal at a subcarrier of the known pilots; and after each iteration updating the dictionary matrix based on statistical properties of the plurality of first contributions of the transmit signal.

In Example 24, the subject matter of Example 23 can optionally include updating the dictionary matrix based on a first order moment of the plurality of first contributions of the transmit signal; and updating a product of an Hermitian conjugate of the dictionary matrix and the dictionary matrix based on a second order moment of the plurality of first contributions of the transmit signal.

In Example 25, the subject matter of any one of Examples 23-24 can optionally include iteratively determining the estimate of the plurality of multipath components until a difference between two consecutive noise variance estimates is smaller than a threshold value.

Example 26 is a computer readable medium on which computer instructions are stored which when executed by a computer, cause the computer to perform the method of one of Examples 1 to 16 or 23 to 25.

Example 27 is a channel estimator for estimating a channel, wherein the channel comprises a plurality of multipath components, the channel estimator comprising: means for receiving a signal comprising a plurality of contributions of a transmit signal transmitted during a plurality of transmission time intervals on a plurality of sub-carriers of known pilots and a plurality of sub-carriers of unknown data; means for determining an estimate of the plurality of multipath components based on a probabilistic relation between a plurality of first contributions of the transmit signal, wherein the plurality of first contributions are transmitted during adjacent transmission time intervals, and an observation of the received signal at a subcarrier of the known pilots, wherein the probabilistic relation is based on statistical properties of the plurality of first contributions of the transmit signal.

In Example 28, the subject matter of Example 27 can optionally include that the probabilistic relation is based on a sparse Bayesian learning framework applying a probability density function of the plurality of multipath components according to a sparse channel model.

In Example 29, the subject matter of any one of Examples 27-28 can optionally include that the probabilistic relation comprises a dictionary matrix with respect to the plurality of first contributions of the transmit signal.

In Example 30, the subject matter of Example 29 can optionally include that the dictionary matrix depends on the plurality of first contributions of the transmit signal and on a delay vector, wherein the delay vector comprises a plurality of delay values of the plurality of multipath components.

In Example 31, the subject matter of any one of Examples 29-30 can optionally include that the probabilistic relation comprises a multiplicative combination between the dictionary matrix and a channel weights vector, wherein the channel weights vector comprises a plurality of channel weights of the plurality of multipath components.

In Example 32, the subject matter of Example 31 can optionally include that the probabilistic relation is according to: $y_n[k]=[\Phi_1(x_n,x_{n-1},\bar{\tau})]_k\bar{\alpha}+\xi$, wherein $y_n[k]$ denotes the signal received at a transmission time interval n on a pilot subcarrier k, $\Phi_1$ denotes the dictionary matrix with respect to subcarrier k, $x_n,x_{n-1}$ denote the plurality of first contributions of the transmit signal transmitted during the $n^{th}$ and the $(n-1)^{th}$ transmission time interval, $\bar{\tau}$ denotes the delay vector, $\bar{\alpha}$ denotes the channel weights vector, and $\xi$ denotes a noise vector.

In Example 33, the subject matter of any one of Examples 31-32 can optionally include that the probabilistic relation is based on a probabilistic model of the plurality of channel weights, the plurality of delay values and a noise precision.

In Example 34, the subject matter of Example 33 can optionally include that the probabilistic relation is based on hierarchical prior modeling of the plurality of channel weights, the plurality of delay values and the noise precision.

In Example 35, the subject matter of any one of Examples 33-34 can optionally include means for determining approximate probability density functions of the plurality of channel weights, the plurality of delay values and the noise precision based on a mean field belief propagation framework.

Example 36 is a circuit for estimating a channel for mobile systems with insufficient cyclic prefix length, wherein the channel comprises a plurality of multipath components, the circuit comprising: means for receiving a signal comprising a plurality of contributions of a transmit signal transmitted during a plurality of transmission time intervals on a plurality of sub-carriers of known pilots and a plurality of sub-carriers of unknown data; means for iteratively determining an estimate of the plurality of multipath components based on a dictionary matrix with respect to a plurality of first contributions of the transmit signal, wherein the plurality of first contributions are transmitted during adjacent transmission time intervals, and based on an observation of the received signal at a subcarrier of the known pilots; and means for updating the dictionary matrix based on statistical properties of the plurality of first contributions of the transmit signal after each iteration.

In Example 37, the subject matter of Example 36 can optionally include means for updating the dictionary matrix based on a first order moment of the plurality of first contributions of the transmit signal; and means for updating a product of an Hermitian conjugate of the dictionary matrix and the dictionary matrix based on a second order moment of the plurality of first contributions of the transmit signal.

In Example 38, the subject matter of any one of Examples 36-37 can optionally include means for iteratively determining the estimate of the plurality of multipath components until a difference between two consecutive noise variance estimates is smaller than a threshold value.

Example 39 is a system for channel estimation, comprising: a receive terminal configured to receive a signal comprising a plurality of contributions of a transmit signal transmitted during a plurality of transmission time intervals on a plurality of sub-carriers of known pilots and a plurality of sub-carriers of unknown data; a processing circuit configured to determine an estimate of the plurality of multipath components based on a probabilistic relation between a plurality of first contributions of the transmit signal, wherein the plurality of first contributions are transmitted during adjacent transmission time intervals, and an observation of the received signal at a subcarrier of the known pilots, wherein the probabilistic relation is based on statistical properties of the plurality of first contributions of the transmit signal.

In Example 40, the subject matter of Example 39 can optionally include a matrix processing unit configured to determine a dictionary matrix with respect to the plurality of first contributions of the transmit signal.

In Example 41, the subject matter of Example 40 can optionally include a statistical processing circuit configured to determine first and second order moments of the plurality of first contributions of the transmit signal.

In Example 42, the subject matter of Example 41 can optionally include that the matrix processing unit is configured to determine the dictionary matrix based on the first and second order moments of the plurality of first contributions of the transmit signal.

In Example 43, the subject matter of any one of Examples 40-42 can optionally include a multiplicative processing unit configured to determine a multiplicative combination of the dictionary matrix and a channel weights vector.

In Example 44, the subject matter of Example 43 can optionally include an additive processing unit configured to add a noise vector to the multiplicative combination of the dictionary matrix and the channel weights vector.

In Example 45, the subject matter of any one of Examples 39-44 can optionally include that the system is an on-chip system.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A method of estimating a channel for mobile systems with insufficient cyclic prefix length, wherein the channel comprises a plurality of multipath components, the method comprising:
   receiving a signal comprising a plurality of contributions of a transmit signal transmitted during a plurality of transmission time intervals on a plurality of sub-carriers of known pilots and a plurality of sub-carriers of unknown data;
   determining an estimate of the plurality of multipath components based on a probabilistic relation between a plurality of first contributions of the transmit signal, wherein the plurality of first contributions are transmitted during adjacent transmission time intervals, and an observation of the received signal at a subcarrier of the known pilots,
   wherein the probabilistic relation is based on statistical properties of the plurality of first contributions of the transmit signal.

2. The method of claim 1,
   wherein the probabilistic relation is based on a sparse Bayesian learning framework applying a probability density function of the plurality of multipath components according to a sparse channel model.

3. The method of claim 1, wherein the probabilistic relation comprises a dictionary matrix with respect to the plurality of first contributions of the transmit signal.

4. The method of claim 3,
   wherein the dictionary matrix depends on the plurality of first contributions of the transmit signal and on a delay vector, wherein the delay vector comprises a plurality of delay values of the plurality of multipath components.

5. The method of claim 3,
   wherein the probabilistic relation comprises a multiplicative combination between the dictionary matrix and a channel weights vector, and wherein the channel weights vector comprises a plurality of channel weights of the plurality of multipath components.

6. The method of claim 5, wherein the probabilistic relation is according to:

$$y_n[k] = [\Phi_1(x_n, x_{n-1}, \bar{\tau})]_k \bar{\alpha} + \bar{\xi},$$

wherein $y_n[k]$ denotes the signal received at a transmission time interval n on a pilot subcarrier k, $\Phi_1$ denotes the dictionary matrix with respect to subcarrier k, $x_n, x_{n-1}$ denote the plurality of first contributions of the transmit signal transmitted during the $n^{th}$ and the $(n-1)^{th}$ transmission time interval, $\bar{\tau}$ denotes the delay vector, $\bar{\alpha}$ denotes the channel weights vector, and $\bar{\xi}$ denotes a noise vector.

7. The method of claim 5,
   wherein the probabilistic relation is based on a probabilistic model of the plurality of channel weights, the plurality of delay values and a noise precision.

8. The method of claim 7,
   wherein the probabilistic relation is based on hierarchical prior modeling of the plurality of channel weights, the plurality of delay values and the noise precision.

9. The method of claim 7, further comprising:
   determining approximate probability density functions of the plurality of channel weights, the plurality of delay values and the noise precision based on a mean field belief propagation framework.

10. The method of claim 9, further comprising:
    determining the approximate probability density functions of the plurality of channel weights, the plurality of delay values and the noise precision based on a von Mises probability density function.

11. The method of claim 7, further comprising:
    iterating between estimating the plurality of channel weights, the plurality of delay values and the noise precision.

12. The method of claim 1,
    wherein the probabilistic relation is based on first and second order statistics of the plurality of contributions of the transmit signal.

13. The method of claim 12,
    wherein the probabilistic relation is based on first and second order moments of the plurality of contributions of the transmit signal.

14. The method of claim 13, further comprising:
    determining the first and second order moments based on a known pilot pattern for the plurality of sub-carriers of known pilots and based on a constant for the plurality of sub-carriers of unknown data.

15. The method of claim 13, further comprising:
    determining the first and second order moments according to:

$$\varepsilon_{p(x_n, x_{n-1})}(x_b[k]) = \begin{cases} x_b[k], & \text{if } k \in P_b \\ 0, & \text{otherwise} \end{cases}$$

$$\varepsilon_{p(x_n, x_{n-1})}(|x_b[k]|^2) = \begin{cases} |x_b[k]|^2, & \text{if } k \in P_b \\ 1, & \text{otherwise} \end{cases},$$

wherein $\varepsilon_{p(x_n, x_{n-1})}(x_b[k])$ denotes the first order moment, $\varepsilon_{p(x_n, x_{n-1})}(|x_b[k]|^2)$ denotes the second order moment, $x_n, x_{n-1}$ denote the plurality of first contributions of the transmit signal transmitted during the $n^{th}$ and the $(n-1)^{th}$ transmission time interval, k denotes the sub-carrier index, wherein $k \in P_b$ indicates the known pilot sub-carriers and $b \in \{n-1, n\}$ is an index of the transmission time interval.

16. The method of claim 1,
    wherein the mobile system comprises an LTE OFDM transmission for which a maximum excess delay of the channel is larger than the cyclic prefix length.

17. A channel estimation device, comprising:
    a receive terminal configured to receive a signal comprising a plurality of contributions of a transmit signal transmitted during a plurality of transmission time intervals on a plurality of sub-carriers of known pilots and a plurality of sub-carriers of unknown data;
    a processing circuit configured to determine an estimate of a plurality of multipath components based on a probabilistic relation between a plurality of first contributions of the transmit signal, wherein the plurality of first contributions are transmitted during adjacent transmission time intervals, and an observation of the received signal at a subcarrier of the known pilots,
    wherein the probabilistic relation is based on statistical properties of the plurality of first contributions of the transmit signal.

18. The channel estimation device of claim 17, further comprising:
    a matrix processing unit configured to determine a dictionary matrix with respect to the plurality of first contributions of the transmit signal.

19. The channel estimation device of claim 18, further comprising:
   a statistical processing circuit configured to determine first and second order moments of the plurality of first contributions of the transmit signal.

20. The channel estimation device of claim 19, wherein the matrix processing unit is configured to determine the dictionary matrix based on the first and second order moments of the plurality of first contributions of the transmit signal.

21. The channel estimation device of claim 18, further comprising:
   a multiplicative processing unit configured to determine a multiplicative combination of the dictionary matrix and a channel weights vector.

22. The channel estimation device of claim 21, further comprising:
   an additive processing unit configured to add a noise vector to the multiplicative combination of the dictionary matrix and the channel weights vector.

23. A method of estimating a channel for mobile systems with insufficient cyclic prefix length, wherein the channel comprises a plurality of multipath components, the method comprising:
   receiving a signal comprising a plurality of contributions of a transmit signal transmitted during a plurality of transmission time intervals on a plurality of sub-carriers of known pilots and a plurality of sub-carriers of unknown data;
   iteratively determining an estimate of the plurality of multipath components based on a dictionary matrix with respect to a plurality of first contributions of the transmit signal, wherein the plurality of first contributions are transmitted during adjacent transmission time intervals, and based on an observation of the received signal at a subcarrier of the known pilots; and
   after each iteration updating the dictionary matrix based on statistical properties of the plurality of first contributions of the transmit signal.

24. The method of claim 23, further comprising:
   updating the dictionary matrix based on a first order moment of the plurality of first contributions of the transmit signal; and
   updating a product of an Hermitian conjugate of the dictionary matrix and the dictionary matrix based on a second order moment of the plurality of first contributions of the transmit signal.

25. The method of claim 23, further comprising:
   iteratively determining the estimate of the multipath components until a difference between two consecutive noise variance estimates is smaller than a threshold value.

* * * * *